(12) United States Patent
Artemiw et al.

(10) Patent No.: US 11,810,100 B2
(45) Date of Patent: Nov. 7, 2023

(54) PAYMENT MILESTONES FOR IMPROVED FINANCIAL HEALTH

(71) Applicant: Apple Inc., Cupertino, CA (US)

(72) Inventors: Michael Artemiw, San Jose, CA (US); Aaron M. Melim, San Francisco, CA (US); Ashish C. Nagre, Sunnyvale, CA (US); Christine A. Franco, Menlo Park, CA (US); David T. Haggerty, San Francisco, CA (US); Fadi S. Obeid, Santa Clara, CA (US); Glen W. Steele, San Jose, CA (US); Katie M. McIndoe, Sunnyvale, CA (US); Mischa K. McLachlan, San Francisco, CA (US); Richard W. Heard, San Francisco, CA (US); Rima Kakarla, Mountain View, CA (US); Akila Suresh, San Jose, CA (US); Jarad M. Fisher, Millbrae, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/828,954

(22) Filed: May 31, 2022

(65) Prior Publication Data
US 2022/0343318 A1 Oct. 27, 2022

Related U.S. Application Data

(63) Continuation of application No. 16/827,202, filed on Mar. 23, 2020, now Pat. No. 11,348,092.
(Continued)

(51) Int. Cl.
*G06Q 20/00* (2012.01)
*G06Q 20/34* (2012.01)
(Continued)

(52) U.S. Cl.
CPC ......... *G06Q 20/343* (2013.01); *G06Q 20/24* (2013.01); *G06Q 20/389* (2013.01)

(58) Field of Classification Search
CPC ..... G06Q 20/343; G06Q 20/24; G06Q 20/389
See application file for complete search history.

(56) References Cited

U.S. PATENT DOCUMENTS

| 7,017,243 B2 | 3/2006 | Carnevali |
|---|---|---|
| 7,177,834 B1 | 2/2007 | Maestle |

(Continued)

OTHER PUBLICATIONS

U.S. Appl. No. 16/827,202, Non-Final Office Action, dated Jul. 2, 2021, 9 pages.
(Continued)

*Primary Examiner* — Jamara A Franklin
(74) *Attorney, Agent, or Firm* — KILPATRICK, TOWNSEND & STOCKTON

(57) ABSTRACT

The disclosed technology provides enhanced financial statements such as credit statements that provide customized payment options to a customer that takes into account the total amount owed by the customer, and past payments made by the customer. The customized payment options are determined with the goal of providing more payment options that encourage financial health, while not overwhelming the customer with too many options or irrelevant options. The customized payment options can be displayed in an interactive user interface for paying a credit statement that can visually inform a user of the benefit of the respective payment options with respect to the impact of the respective payment option on the customer's financial health—at least as it pertains to a credit account for which the statement was issued.

20 Claims, 11 Drawing Sheets

Related U.S. Application Data

(60) Provisional application No. 62/822,924, filed on Mar. 24, 2019.

(51) Int. Cl.
*G06Q 20/38* (2012.01)
*G06Q 20/24* (2012.01)

(56) References Cited

U.S. PATENT DOCUMENTS

| | | | |
|---|---|---|---|
| 7,340,423 B1 | 3/2008 | Blagg et al. | |
| 9,934,494 B1 | 4/2018 | Nolte et al. | |
| 11,348,092 B2 | 5/2022 | Artemiw et al. | |
| 2004/0088253 A1* | 5/2004 | Crispyn | G06Q 30/04 |
| | | | 705/40 |
| 2007/0239582 A1* | 10/2007 | Tyson | G06Q 40/06 |
| | | | 705/36 R |
| 2017/0039565 A1 | 2/2017 | Dermosessian et al. | |

OTHER PUBLICATIONS

U.S. Appl. No. 16/827,202, Notice of Allowance, dated Feb. 2, 2022, 9 pages.

"Ex Parte Quayle Action," mailed Feb. 28, 2023 in U.S. Appl. No. 17/947,929. 8 pages. (no copy provided).

* cited by examiner

PAYMENT MILESTONES FOR IMPROVED FINANCIAL HEALTH

CROSS REFERENCE TO RELATED APPLICATIONS

This application is a continuation of U.S. application Ser. No. 16/827,202, filed Mar. 23, 2020, which claims priority to U.S. provisional application No. 62/822,924, filed on Mar. 24, 2019; which are expressly incorporated by reference herein in their entirety.

TECHNICAL FIELD

The present technology pertains to a technology for helping customers achieve improved financial health and more specifically pertains to a technology for calculating payment milestones for a financial statement that can help customers achieve improved financial health.

BACKGROUND

Typical financial statements are not designed with the best interests of a customer in mind. Credit card statements, for example, typically provide only required statement categories such as a minimum due, a balance from the previous statement, and the total amount owed. Unfortunately, listing these required statement categories gives some customers a false sense that there are no other options. Even if they may realize they can pay any amount they desire, many customers don't have the financial literacy or don't take the time, to be able to figure out a healthier option than paying the minimum. Some customers feel they have paid their bill when they pay the minimum amount due. Whereas, in reality, paying the minimum balance hurts the customer by accruing interest charges. In some instances, the interest owed might be greater than the minimum amount due.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Figure 1:
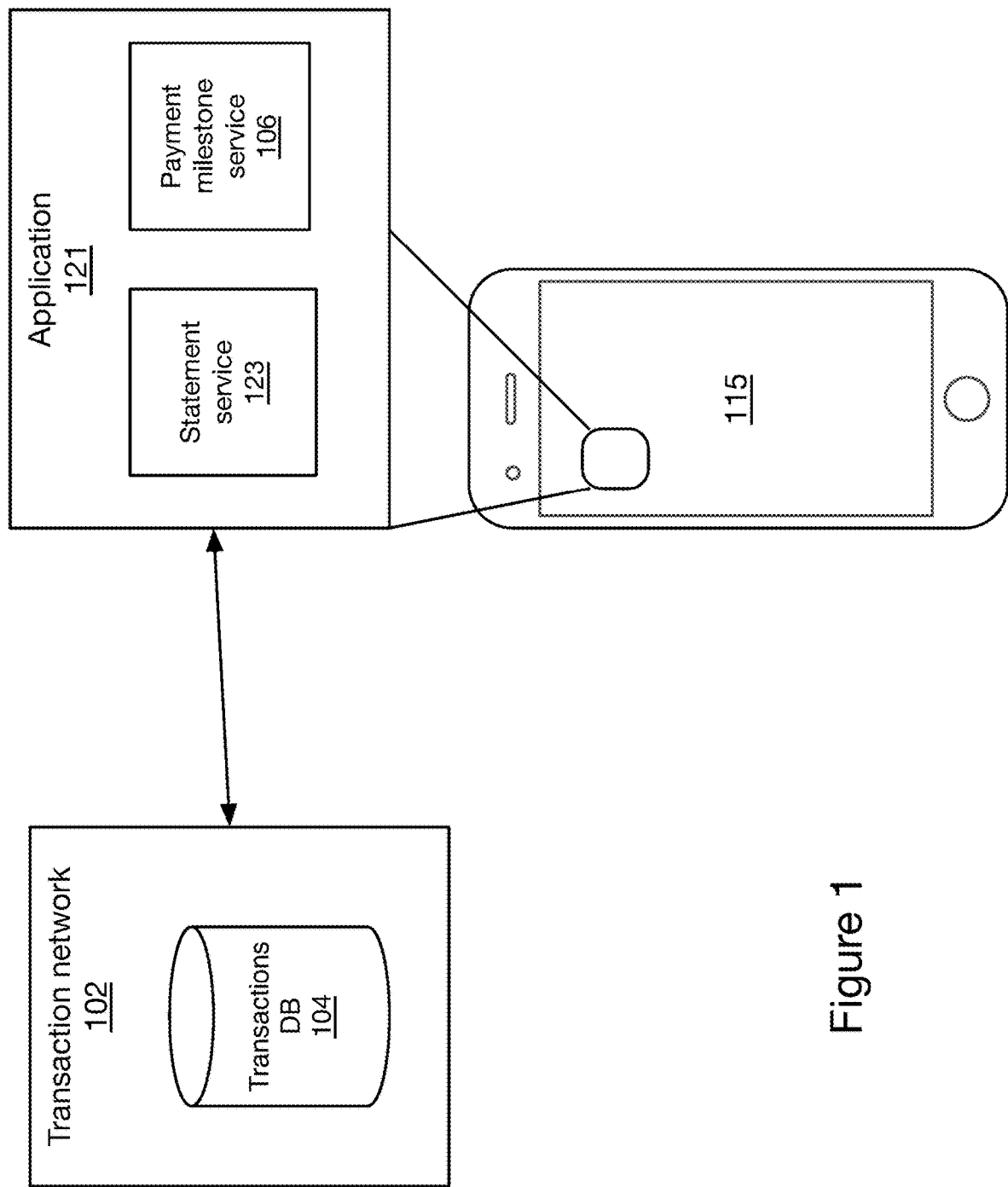
FIG. 1 illustrates an example system embodiment in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The disclosed technology addresses the need in the art for a technology that can provide enhanced financial statements such as credit statements that provide customized payment options to a customer that takes into account the total amount owed by the customer, and past payments made by the customer. The customized payment options are determined with the goal of providing more payment options that encourage financial health, while not overwhelming the customer with too many options or irrelevant options. The customized payment options can be displayed in an interactive user interface for paying a credit statement that can visually inform a user of the benefit of the respective payment options with respect to the impact of the respective payment option on the customer's financial health—at least as it pertains to a credit account for which the statement was issued.

As described herein, one aspect of the present technology is the gathering and use of data available from various sources to improve financial statements. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to generate and deliver financial statements with customized payment amounts that encourage better financial health of the customer.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of customized payment options on financial statements, the present technology can be configured to allow users to select to "opt-in" or "opt out" of participation in the collection of personal information data during registration for services or anytime thereafter. In addition to providing "opt-in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers the use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, customized payment options on financial statements can be generated by based on non-personal information data or a bare minimum amount of personal information, such as the content being requested by the device associated with a user, other non-personal information available to the financial statement server, or publicly available information.

FIG. 1 illustrates an example system embodiment for providing enhanced financial statements, such as credit statements, that provide customized payment options to a customer. The system includes transaction network 102 having a transactions database 104. Transaction network 102 can include a payment back-end architecture for processing and clearing payments. For example, transaction network 102 can include a credit card or debit card network, and a account provider that issued a credit/debit card. Transactions database 104 stores at least information regarding transactions associated with a customer's financial account and the respective dates on which the transactions occurred. In some embodiments, transactions database 104 also includes category information regarding the respective transactions. Each of the transactions in transactions database 104 can be reported from transaction network 102.

In some embodiments, application 121 can maintain its own database of transactions. In such embodiments, transaction network 102 can report information about transactions as the transactions clear. In such embodiments, application 121 can effectively have a copy of the data in transactions database 104 for the user account stored on computing device 115. In some embodiments, transactions database might only exist on computing device 115.

In some embodiments, the transaction network 102 can provide information regarding a transaction that includes information regarding a merchant, the date of a transaction, a category of the transaction or of the merchant (such as groceries, pharmacy, travel, entertainment, kids, pets, etc.) to be stored with transactions in transaction database 104. In some embodiments, payment milestone service 106 can enhance or modify the information regarding the transaction received from the transaction network 102 and store the enhanced or modified information in a local copy of transactions database 104 stored on client device 115.

In some embodiments transaction network 102 can also be configured to prepare a statement for a user account. A statement can include one or more webpages or app pages for displaying a listing of transactions that have taken place during a statement period for a particular customer's account and can provide payment options. In some embodiments transaction network 102 can be configured to send information about transactions to application 121, which can create a statement using statement service 123. While conventional statements may only provide information regarding a limited number of balance summaries that are not particularly helpful to a customer in deciding how to maintain or manage the account, the present technology provides payment milestones that help a customer know how to better maintain and manage the account and achieve improved financial health.

Payment milestone service 106 can be used to calculate a plurality of payment milestones based on account specific information including total balance information, the amount paid during the previous statement period, total spent per category of transaction, etc. Payment milestone service 106 can further determine which of these payment milestones should be provided on a transaction statement to the customer.

A customer can view the transaction statement of the present technology using a computing device such as computing device 115 having application 121 executing thereon. Application 121 can include statement service 123, which can receive a statement for a customer account associated with a user of computing device 115 from transaction network 102, or can receive information regarding transactions during a statement period from transaction database 104 (whether stored on transaction network 102, or computing device 115) and create a statement for the customer account.

Statement service 123 can interact with payment milestone service 106 to enhance a conventional statement. In some embodiments, statement service can enhance a statement received from transactions network 102 with payment milestones. In some embodiments, such as when statement service 123 prepares a statement, statement service 123 can utilize payment milestone service 106 to determine milestones for statement service 123 to include in a statement.

Figure 2:
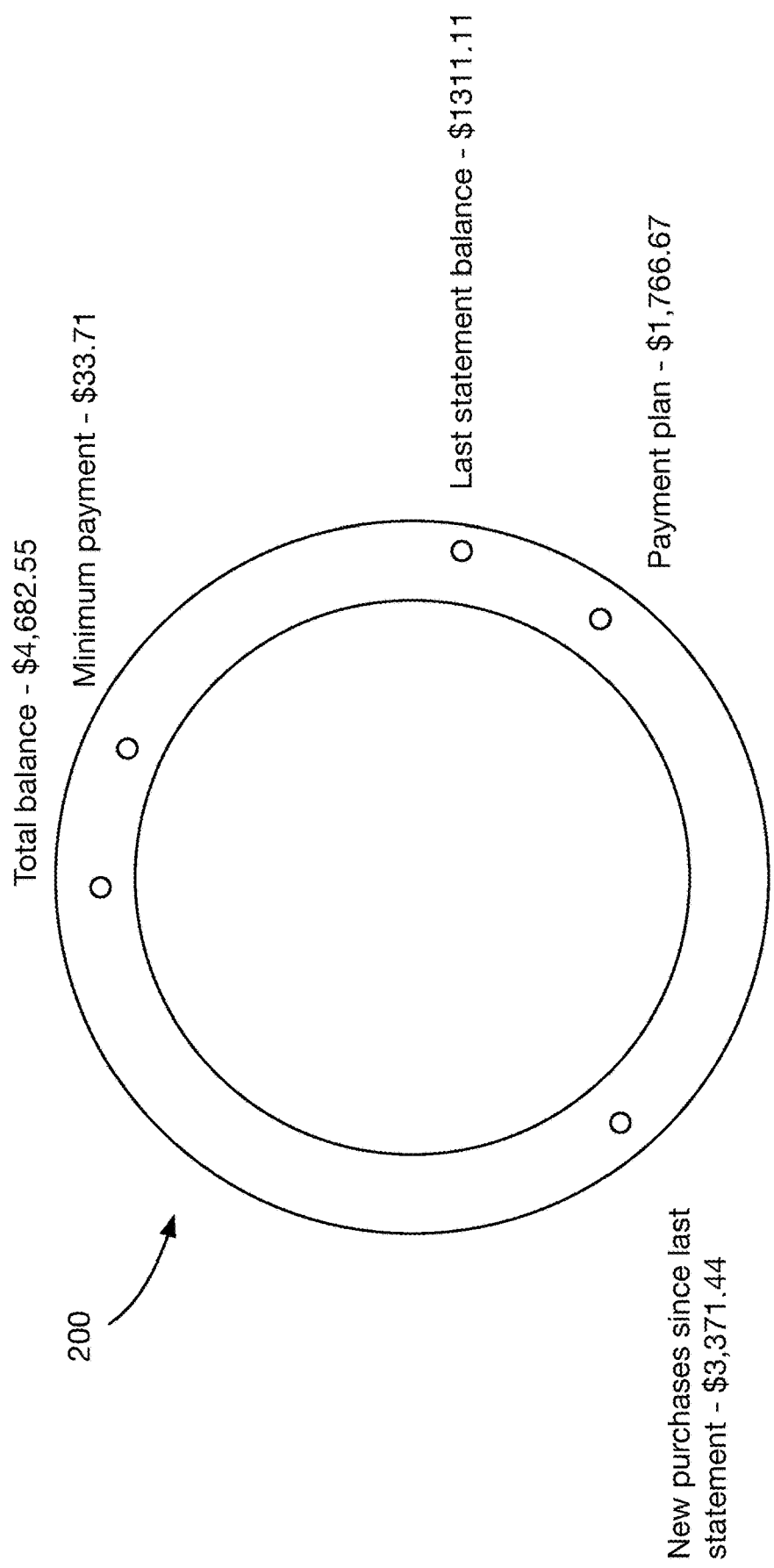
FIG. 2 illustrates an example user interface presenting payment milestones in accordance with some aspects of the present technology.

FIG. 2 illustrates an example graphical user interface 200 for inclusion on the statement created by the present technology. As illustrated in FIG. 2, graphical user interface 200 includes the typically required statement categories of a total balance, a minimum payment, and last statement balance, but in addition, also includes helpful payment milestones including a payment plan milestone and a new purchases milestone. These milestones and other payment milestones will be discussed in greater detail herein.

Figure 3:
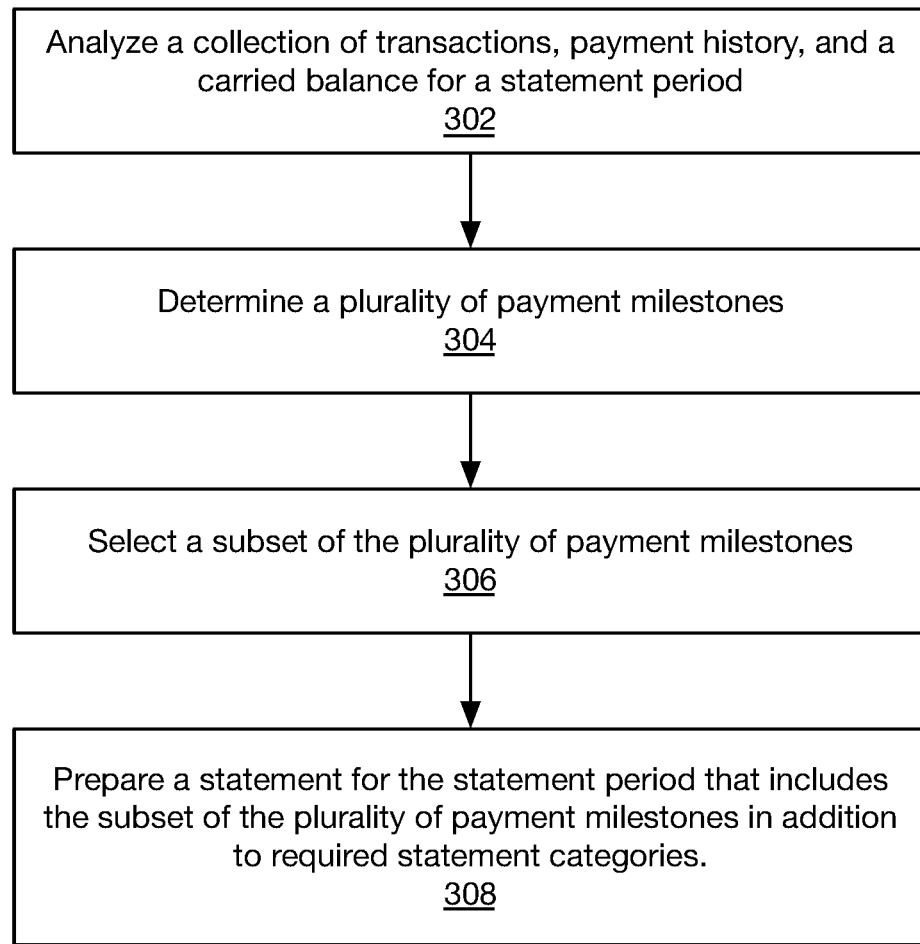
FIG. 3 illustrates an example method embodiment for preparing a statement including payment milestones in accordance with some aspects of the present technology.

FIG. 3 illustrates an example method embodiment for preparing a statement including payment milestones. Payment milestone service 106 can analyze (302) at least a collection of transactions stored in transactions database 104 and a carried balance for statement period for a customer account associated with a user of computing device 115. From the collection of transactions and other information associated with the customer account, payment milestone service 106 can determine (304) a plurality of payment milestones for potential inclusion on a statement.

After payment milestone service 106 has determined (304) the plurality of payment milestones, payment milestone service 106 can select (306) a subset of the plurality of payment milestones for inclusion on the statement, and can prepare (308) the statement for the statement period that includes the selected (306) plurality of payment milestones in addition to the required statement categories (total balance, minimum payment, and last statement balance).

Payment milestone service 106 selects (306) a subset of the plurality of payment milestones in order to present a useful amount of information to the customer. While there may be any number of ways and rationales to calculate payment milestones, they will only be useful if the payment milestones are both distinguishable from each other and they provide meaningful recommendations that are within the customer's financial ability to select. Therefore payment milestone service 106 selects (306) a subset of the plurality of payment milestones to meet the objectives.

Figure 4:
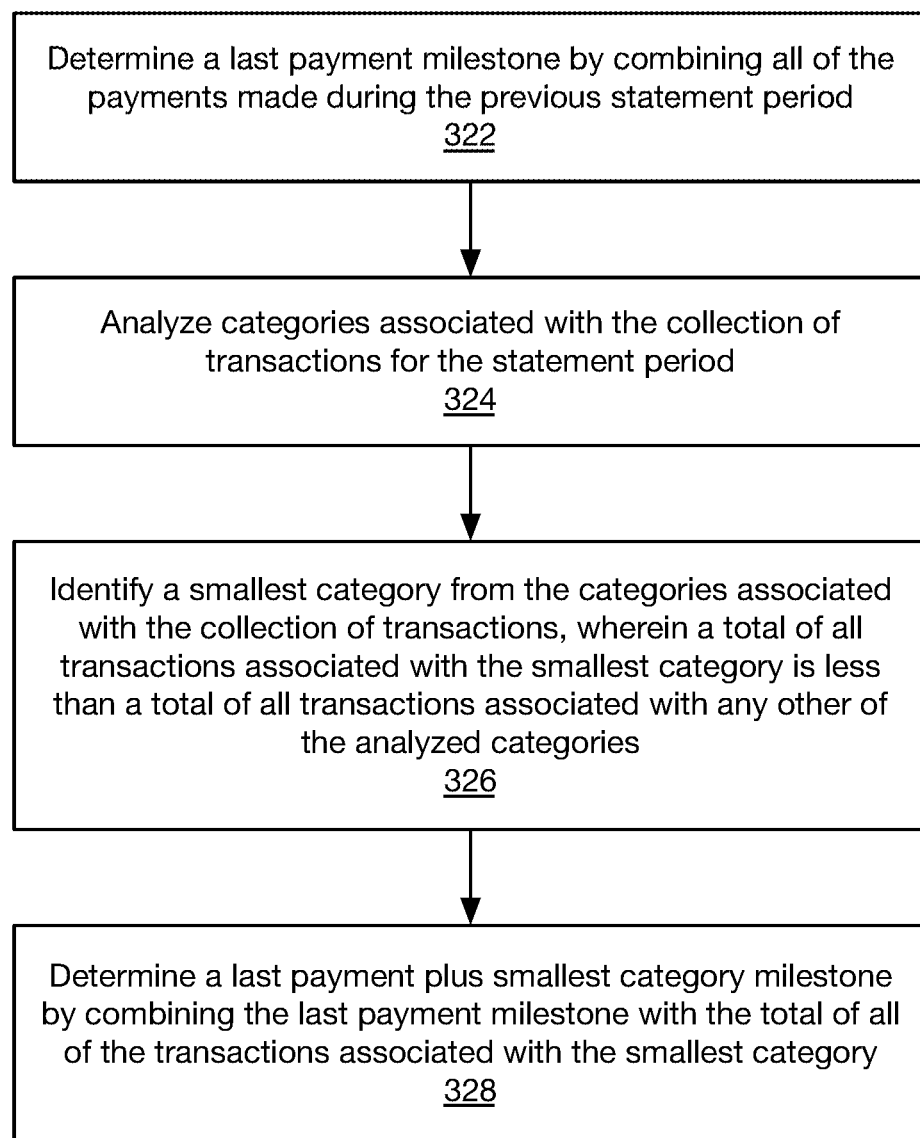
FIG. 4 illustrates an example method embodiment for determining a "payment plus smallest category" payment milestone in accordance with some aspects of the present technology.

FIG. 4 illustrates an example method embodiment for determining a "last payment plus smallest category" milestone. As the name of the milestone implies, the milestone is defined by the summation of all payments made during the last statement period plus the value of all transactions associated with a smallest category of transactions from the present statement period.

Specifically, payment milestone service 106 can determine (322) a "last payment" milestone by combining all of the payments made during the previous statement period. Payment milestone service 106 can then analyze (324) categories associated with the collection of transactions in the statement period to identify (326) a smallest category from the categories associated with the collection of transactions. The total of all transactions associated with the smallest category is less than a total of all transactions associated with any other analyzed category. Payment milestone service 106 can then determine (328) the "last payment plus smallest category" milestone by combining the "last payment" milestone with the total of all transactions associated with the smallest category of transactions.

The "last payment" milestone can be useful to include on statements when a customer is trying to pay down their statement balance and at the same time is trying to spend less. It has been observed that sometimes when a customer spends less, they use their behavior of spending less as a license to also pay less toward their statement balance which in reality delays or prevents the customer's ability to pay down the statement balance. Therefore the "last payment" milestone can be used to encourage a customer to continue to make payments at least as large as the payment they made in response to a previous statement. In some embodiments, payment milestone service 106 will not select any payment milestones for inclusion on the statement that are less than the "last payment" milestone.

The "last payment plus smallest category" milestone can be useful to include on the statement when a customer's balance is growing. This milestone can be presented to encourage a customer to both pay a small amount more than the amount they paid in response to the previous statement, but also encourage the reduction in spending by subtly suggesting that they may be able to do without purchases in this smallest category.

In some embodiments, a reference to a previous statement refers to a statement from an immediately previous statement period. However, in some embodiments, a reference to a previous statement can refer to statements from one or more previous statement periods, such as statements from statement periods taking place in the last three months.

Figure 5:
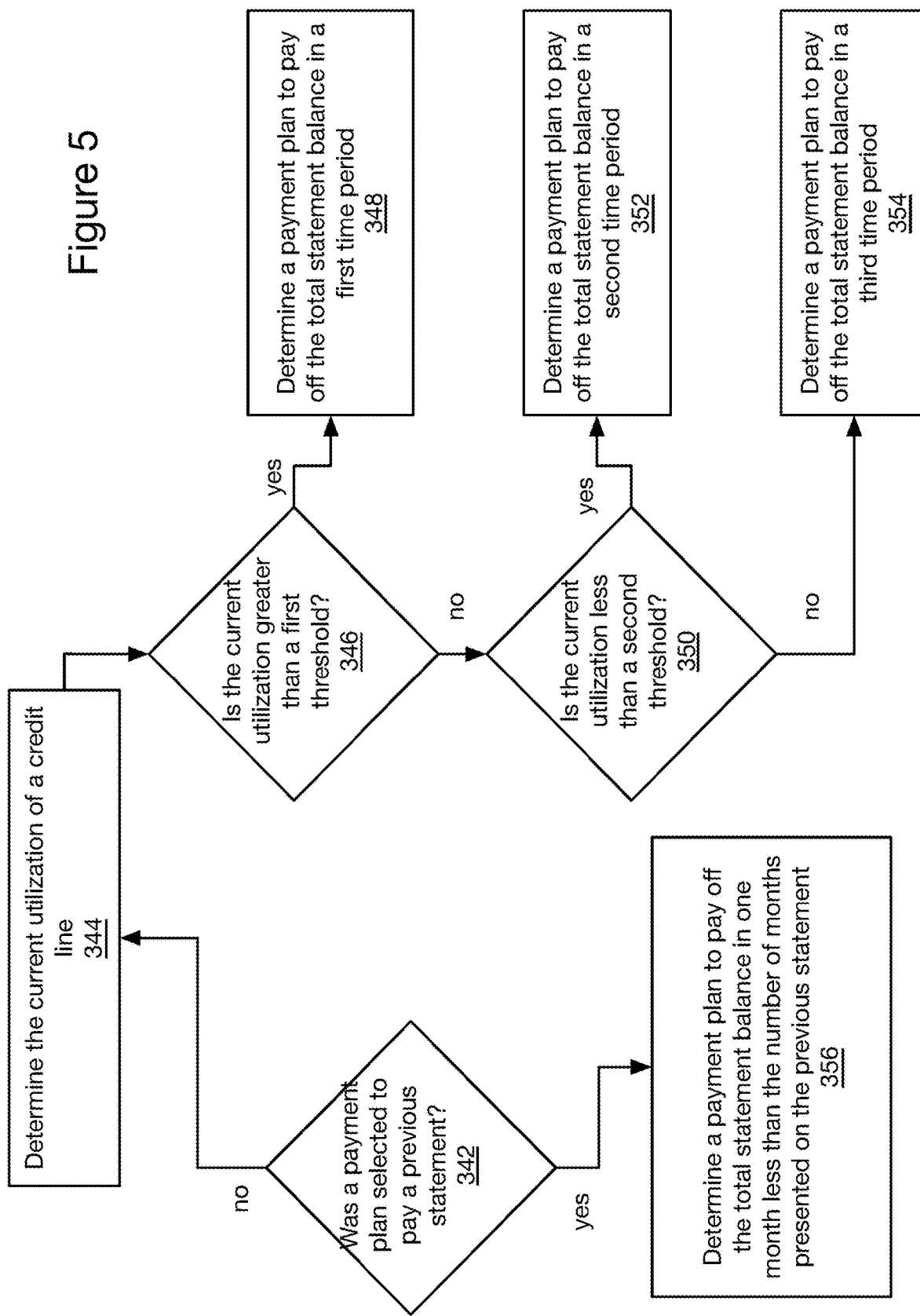
FIG. 5 illustrates an example method embodiment for determining a "payment plan" payment milestone in accordance with some aspects of the present technology.

FIG. 5 illustrates an example method for determining a "payment plan" milestone. Depending on the total credit utilization percentage for the customer's account, payment milestone service 106 can customize a payment plan for the user account to pay off the total statement balance in one of three time periods. Each customer account typically is associated with a maximum credit limit, and the amount of credit used can be referred to as the utilization of the credit limit. The maximum credit limit for a given customer account is typically specific to the customer and is based on the credit issuer's evaluation of the customer's creditworthiness. Therefore rather than use a fixed dollar amount the present technology looks to a percentage utilization of the credit limit to approximate how long a customer might need to reasonably pay off the total statement balance. For example, if a customer's credit utilization is less than 33% of the credit limit then payment milestone service 106 can determine a payment plan to pay off the total statement balance within three months. If a customer's credit utilization is greater than 67% of the credit limit, payment milestone service 106 can determine a payment plan to pay off the total statement balance within nine months. And, if a customer's credit utilization is between 34% and 66% of the credit limit, payment milestone service 106 can determine a payment plan to pay off the total statement balance within six months.

It will be appreciated that payment milestone service can also use other mechanisms to determine how long of a payment period is appropriate for a payment plan. For example, payment milestone service can determine that payments over a determined amount should be avoided, and therefore a payment plan might require an increased term in order to keep payments under the determined amount.

FIG. 5 illustrates an example method for determining a "payment plan" milestone based on the customer's current credit utilization. Payment milestone service 106 first determines (342) whether a payment plan was previously calculated and selected to pay a previous statement. Assuming a payment plan has not previously been selected by the customer, payment milestone service 106 can determine (344) the current credit utilization of the credit line. If the determined (344) current utilization of the credit line is greater than a first threshold (346) then payment milestone service 106 can determine (348) a payment plan to pay off the total statement balance in a first period of time. For example, if the credit utilization is greater then the threshold of 66%, the payment milestone service 106 can determine a payment plan to pay off the total statement balance in nine months.

When the current credit utilization is not greater than the first threshold (346) then payment milestone service 106 can determine if the credit utilization is less than a second threshold (350). If the credit utilization is less than the second threshold (350) payment milestone service 106 can determine (352) a payment plan to pay off the total statement balance in a second time period. For example, if the credit utilization is less than 34%, then payment milestone service 106 can determine (352) a payment plan to pay off the total statement balance in three months.

When the credit utilization is neither greater than the first threshold (346) nor less than the second threshold (350) then payment milestone service 106 can determine (354) a payment plan to pay off the total statement balance in a third time period. For example, if the credit utilization is between 34% and 66% (i.e., not greater than the first threshold 66%, and not less than the second threshold 34%) then payment milestone service 106 can determine (354) a payment plan to pay off the total statement balance in six months.

When the determined payment plan has been presented to the customer in statement service 123 of application 121 and has been selected, payment milestone service 106 must record the selection of the payment plan so that future statements can continue to present the selected payment plan with adjustments reflecting how many months have passed since the payment plan was initially selected. For example, if the customer has selected a six-month payment plan in January a statement in February should reflect five months remaining on the payment plan. Likewise, the statement in March should reflect four months remaining on the payment plan, and so forth. Accordingly, and returning to step 342, payment milestone service 106 can determine (342) whether a payment plan was selected to pay a previous statement. If the customer selected a payment plan to pay a previous statement then payment milestone service 106 can determine (356) a payment plan to pay off the total statement balance in one month less than the number of months presented on the immediately previous statement.

In this embodiment, the selection of a milestone in one month affects what a customer will see in the next month since the selection of a payment plan in a first month will cause presentation of the same payment plan continued in the second month.

While the number of months remaining in the payment plan has continuity from one statement to the next, the payments for the payment plan might vary from month-to-month since the credit line is active. For example if a user selects a three-month payment plan to pay off a balance of $750 that includes $150 of new spending in the current statement period and $600 of carried balance from a the previous statement, the payment plan would call for a payment of $350 ($200 to pay off the carried balance in 3 months, plus the $150 from the current statement period) in the first month of the payment plan. The payment plan might call for the user to make a payment of $300 in the second month assuming the customer utilized an additional $100 of credit in new transactions during the statement period ($200 to pay off the carried balance in 3 months, plus the $100 from the current statement period). Finally, the payment plan might call for the user to make a payment of $365 in the third month assuming the customer utilized an additional $165 of credit in new transactions during the statement period ($200 to pay off the carried balance in 3 months, plus the $165 from the current statement period).

In some embodiments, the payment milestone service 106 can take into account the average amount of new transactions made by the customer each month when making a payment plan in an attempt to yield more equal payments. For example assuming the customer started with a balance of $600 and the customer makes on average $140 in new transactions each payment period, payment milestone service 106 can determine that making a payments of approximately $340 (excluding interest calculations) is likely to yield approximately even payments over a three month payment plan as opposed to payments of $350 in the first month $300 in the second month and $365 in the third month which would be the approximate amounts if the payment milestone service merely reacted to a new transactions each month instead of anticipating them.

Of course, while an average amount of new transactions each month can be anticipated, payment milestone service 106 will need to react to some degree to the actual amount of new transactions in any statement period.

In some embodiments, payment milestone service 106 can recommend to a customer to discontinue a payment plan when the actual amount of new transactions in a particular month represents a large deviation from the anticipated average amount of new transactions (e.g., the actual amount of new transactions is greater than the anticipated average amount of new transactions by a determined percentage, or deviation, or the credit utilization on the account has jumped a threshold (was less than 33% and now credit utilization is greater, or was less than 66% and now credit utilization is greater). This embodiment might occur if the customer makes an unusual, large, purchase with only a few months left to go on the payment plan. Instead, payment milestone service 106 can recommend a new payment plan to help the customer pay off the large purchase.

Regardless of whether an existing payment plan is in progress, payment milestone service 106 can identify a large single purchase in the recent transaction history to choose a portion to revolve by suggesting the customer pay for their "regular purchases" plus a third of the large purchase.

Payment milestone service 106 can also use machine learning to evaluate the customer's transaction history to predict likely future month spend and base the payments of a payment plan on the current balance combined with the predicted likely future month spend.

Payment milestone service 106 can also determine seasonal spending variations and adjust milestone recommendations or payment plans to smooth over expected peaks in spending. For example, payment milestone service 106 can predict that spending is headed up and can raise earlier payments to reduce risk of failure once the increased spending hits its peak.

Payment milestone service 106 can also determine that a customer has a history of large payments at specific times of year, and can create a plan to pay an amount each month, along with a greater amount with their tax return to help get the large payments paid off.

Payment milestone service 106 can also use machine learning to generate payment plans based on various periods by optimizing for the likelihood of the customer selecting the initial payment amount.

Payment milestone service 106 can use machine learning to generate plans based on various periods and variable payment amounts by optimizing for the likelihood of the customer completing the entire payment plan.

In some embodiments, payment plans can be created by payment milestone service 106 that get customer to a lower utilization level (but not zero debt) as a stepping stone toward getting debt free.

In some embodiments, payment plans can be created by payment milestone service 106 in relation to the real calendar (e.g., pay off debt by summer, pay off debt before school starts, reduce your debt by half by your birthday, etc.)

In some embodiments, payment milestone service 106 can review the customer's payment history to predict the highest amount they can sustainably afford to pay off their debt as quick as possible.

In addition to the payment milestone addressed above, other milestones can include a minimum balance plus cash rewards milestone and a default milestone, etc. In some embodiments, any milestone can be increased by the amount of a cash rewards milestone. Use of the account can be accompanied by a cash back reward. This reward could be used to pay off account balances. As a way of encouraging better fiscal health, a milestone, such as the minimum balance payment can be increased by an amount of cash back earned during the statement period. A default milestone could be an average of a minimum amount due and the total account balance. Such a default milestone could be useful especially when an account is new and more sophisticated milestones are not able to be calculated.

Figure 6:
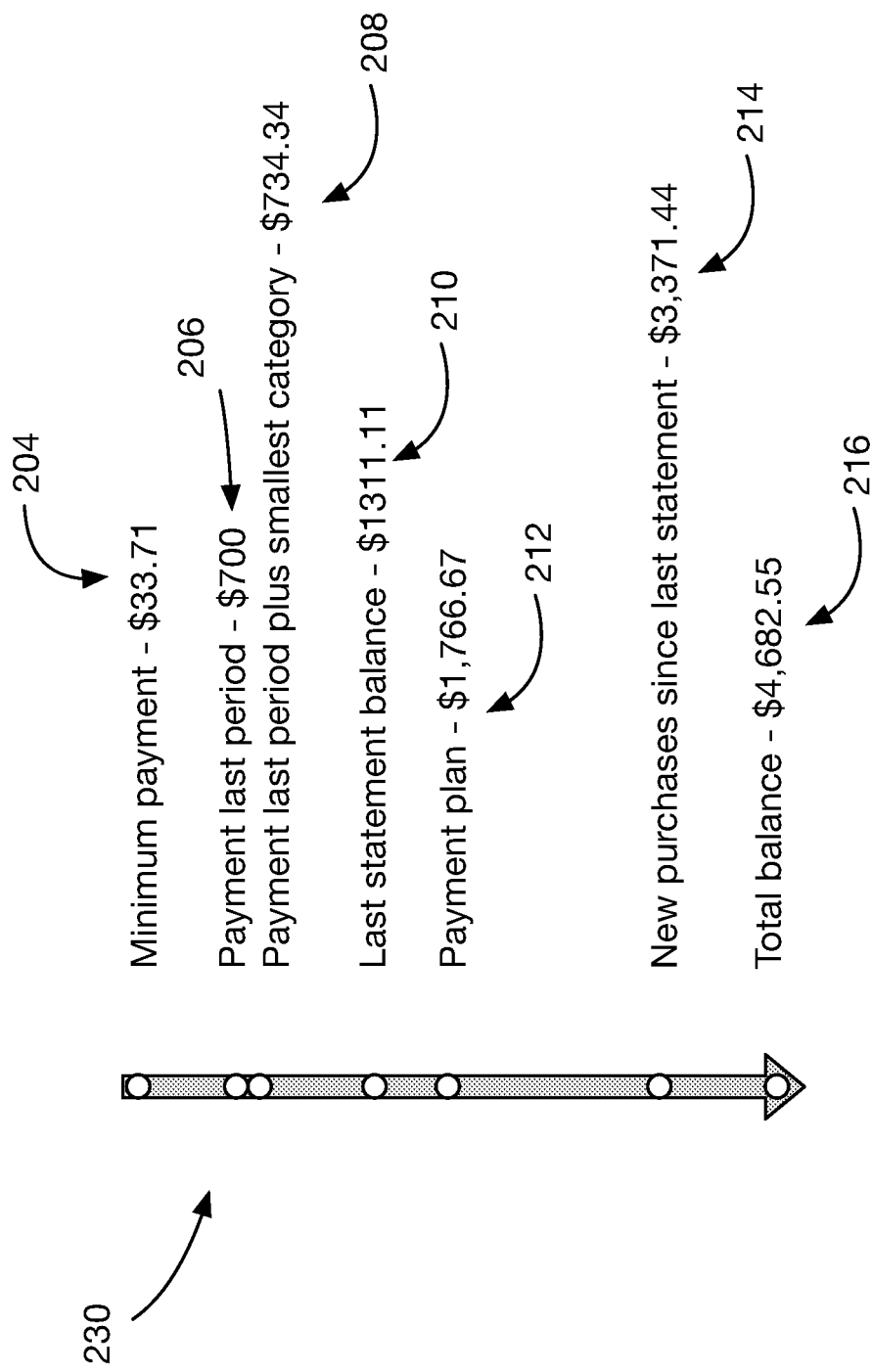
FIG. 6 illustrates an example user interface presenting payment milestones in accordance with some aspects of the present technology.
Figure 7:
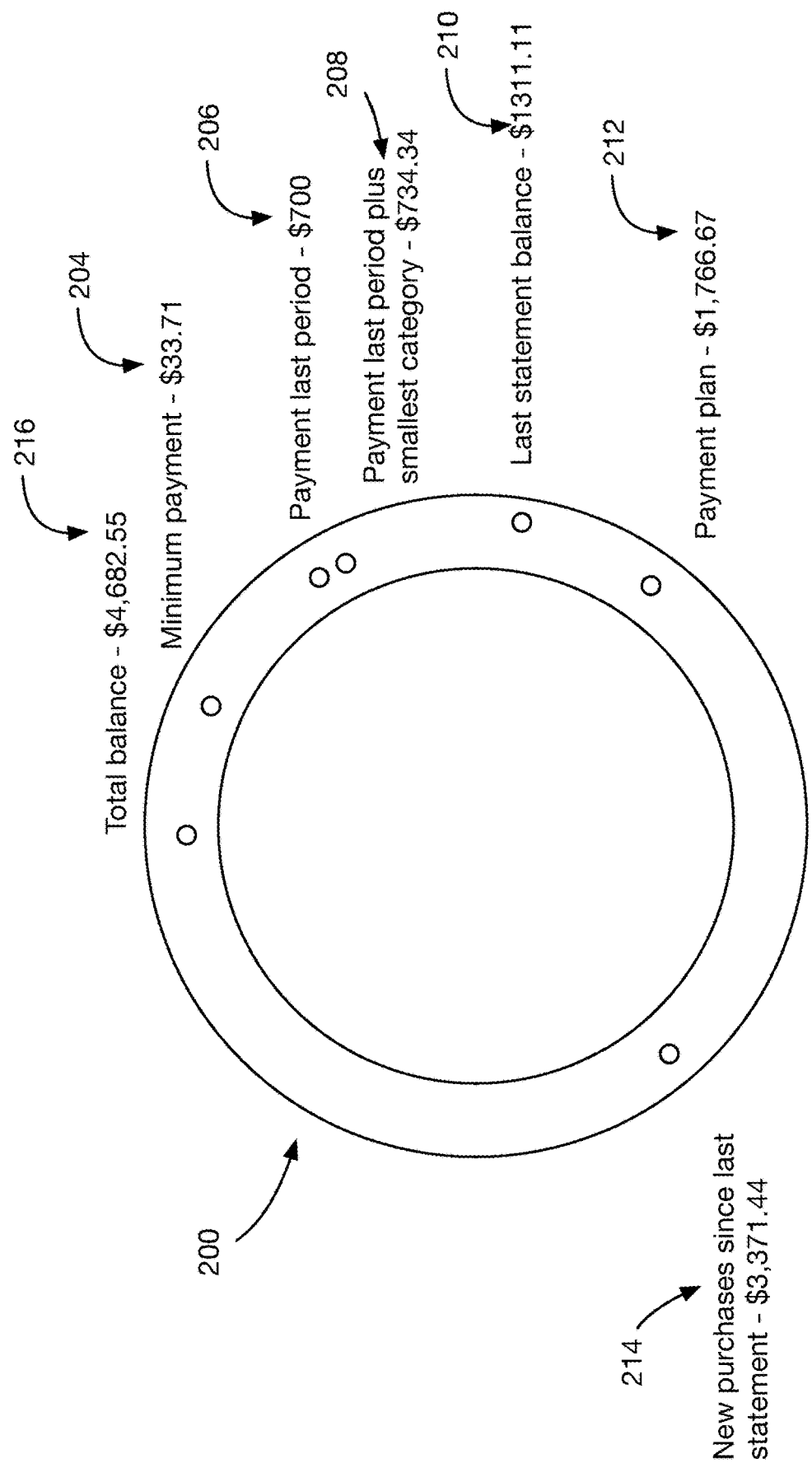
FIG. 7 illustrates an example user interface presenting payment milestones in accordance with some aspects of the present technology.

FIG. 6 and FIG. 7 illustrates example graphical user interfaces 200 and 230 for presenting payment milestones along with required statement categories. The presented payment options (milestones and required statement categories) are organized in order from least payment amount to the greatest payment amount. For example, FIG. 6 illustrates the first payment option 204 for the required statement category, minimum payment. This is followed by a second payment option 206 for the payment milestone "payment last period." This is followed by a third payment option 208 for the payment milestone "payment last period plus smallest category." The next payment option 210 is for the required statement category, last statement balance. The next payment option 212 is for the payment plan milestone. This is followed by the payment option 214 for the payment plan milestone "new purchases since last statement." The final payment option 216 is the required statement category, total balance.

While FIG. 6 and FIG. 7 show a plurality of payment milestones, it should be appreciated by those ordinary skill in the art that more or less or different payment milestones can be presented. Additionally, it should be appreciated that the order of the payment options can change depending on the values associated with each payment option. In some embodiments, the payment options should be listed in substantially the order of increasing or decreasing value. In some embodiments, the payment options should be listed in order of a most recommended payment option to least recommended payment option. For example while the payment option to pay off the total balance might be best for financial health a most recommended option could be an option that balances the likelihood that a user can realistically accept the option with the desire to promote the best options for financial health (i.e., the options for paying off the greatest balance, or at least minimizing interest charges).

As illustrated in FIG. 6 and in FIG. 7 too many payment milestones and required statement categories make the interface is crowded, and some options do not present any meaningful difference from other options.

Figure 8:
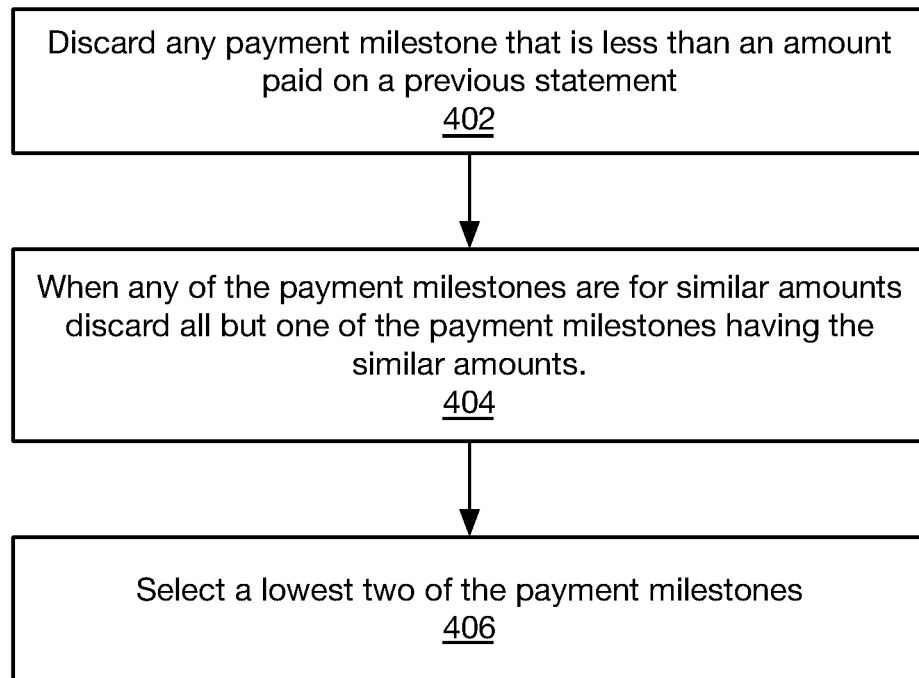
FIG. 8 illustrates an example method embodiment for determining which payment milestones to display in a user interface in accordance with some aspects of the present technology.

In order to increase the value of the options presented in user interfaces 202 and 230, FIG. 8 illustrates an example method for selecting a subset of payment milestones to be included in the user interface. For example payment milestone service 106 can discard (402) any payment milestone that is less than an amount paid on a previous statement. The previous statement can be the immediately previous statement or a previous statement that happened in a recent previous transaction period.

Further payment milestone service 106 can discard (404) all but one payment option having a similar amount. For example, if several payment options are within 10% of the total balance of each other one or more options should be rejected. For example payment option 206 and option 208 illustrated in FIG. 6 and in FIG. 7 are for substantially similar amounts, and one of these options should be discarded. In some embodiments, when payment milestone service 106 is selecting between two payment milestones that are too similar, payment milestone service 106 can select the payment milestone that provides the greatest financial health.

In some embodiments, when payment milestone service considers payment options that include a required statement category and a payment milestone, payment milestone service 106 should select the required statement category.

In some embodiments, when payment milestone service 106 is considering three or more payment options, payment milestone service 106 can optimize to present the greatest number of payment milestones. For example, if there are three payment milestones that are each 6% greater than the immediately preceding payment milestone, payment milestone service 106 can discard the middle payment milestone to preserve the least and the greatest of the three payment milestones.

In some embodiments, payment milestone service 106 can further select (406) a lowest two of the payment milestones, in order to not present the customer with more than five payment options (when including required statement categories).

While FIG. 8 illustrates an example method for reducing the number of payment options displayed, it should be appreciated by those of ordinary skill in the art that other logic can be used to reduce the number of payment categories.

Figure 9:
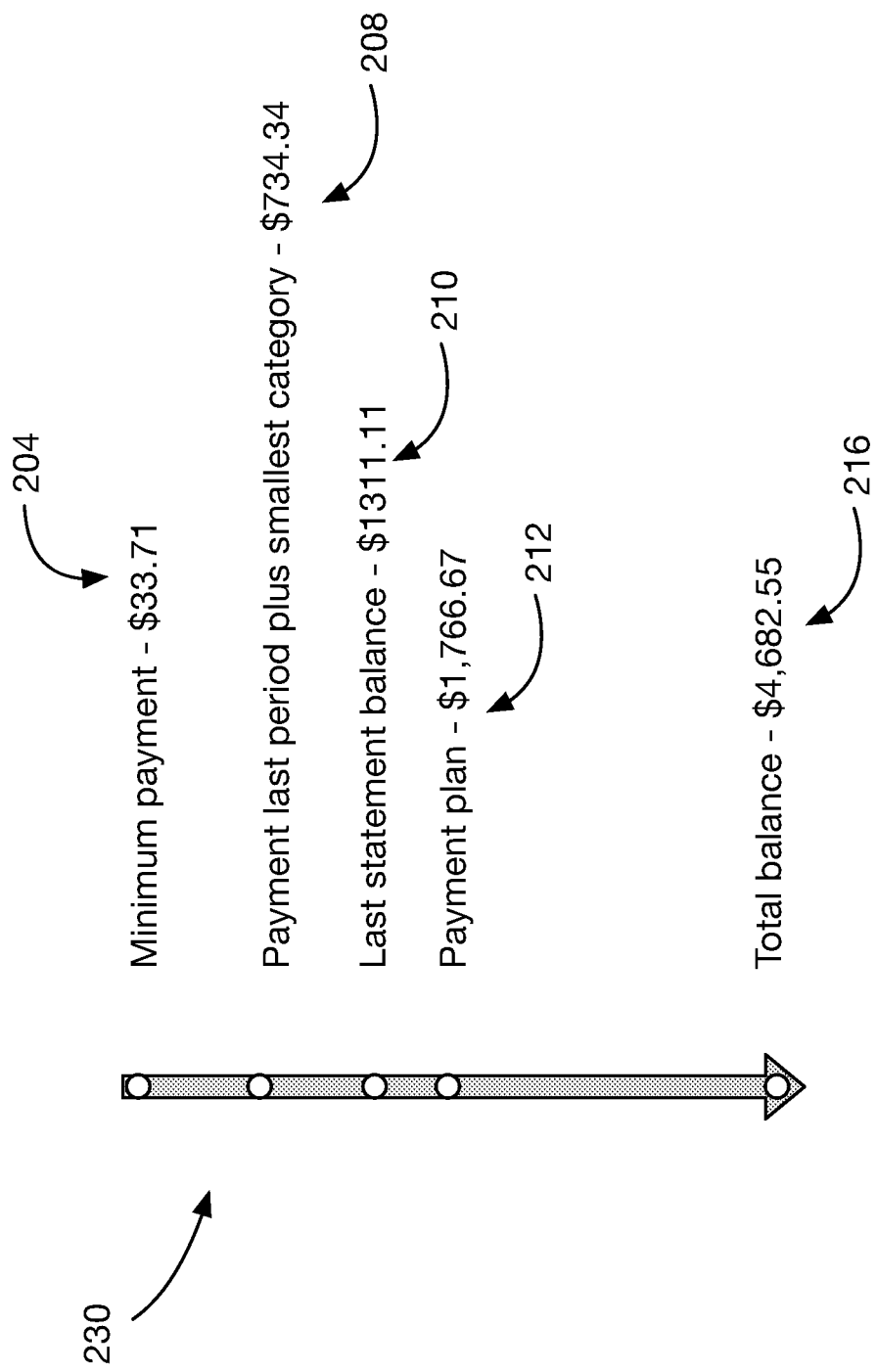
FIG. 9 illustrates an example user interface presenting payment milestones in accordance with some aspects of the present technology.

FIG. 9 illustrates user interface 230 with several payment options removed (relative to user interface 230 illustrated in FIG. 6) in accordance with the embodiment disclosed with respect to the method in FIG. 8. For example, in FIG. 6 payment option 206 and payment option 208 are substantially similar, and therefore in FIG. 9 only payment option 208 is presented. Additionally, payment option 214 was discarded since it was not one of the least two payment options.

Figure 10:
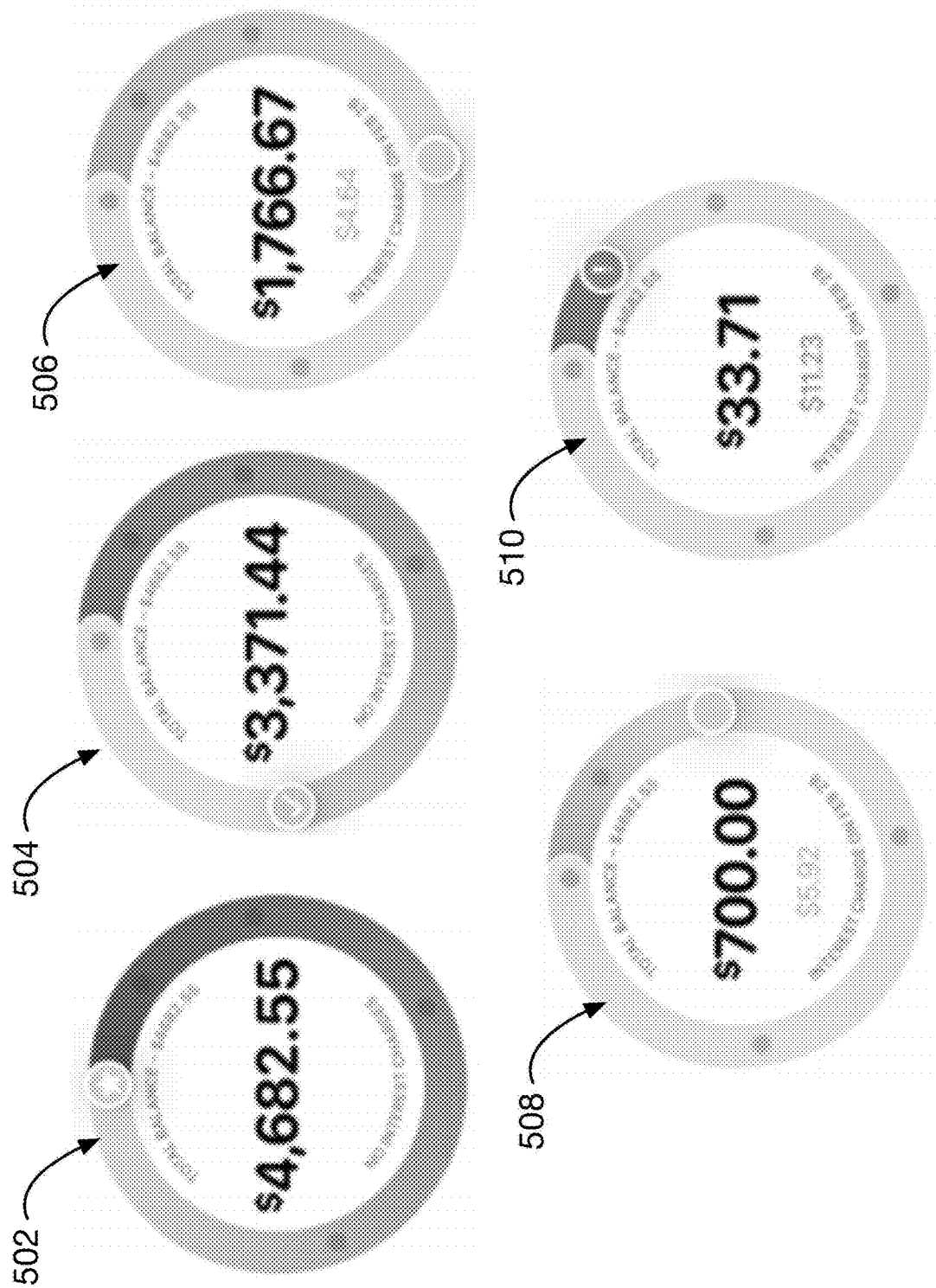
FIG. 10 illustrates an example user interface presenting payment milestones in accordance with some aspects of the present technology.

FIG. 10 illustrates an example animation of a statement user interface in accordance with the present technology. When a customer first views the statement, user interface 502 can be displayed showing a default selection to pay the total balance along with a star icon which is intended to provide positive reinforcement for this option. The customer can then provide inputs into statement service 123 of application 121 to select other payment options, and the user interface in FIG. 10 will animate to adjust to the selected option. For example, when the option represented in user interface 504 is selected, the user interface will animate to that option which reflects the total amount of new purchases made in the last statement period and is coupled with positive reinforcement of a checkmark. The option represented in 506 represents a "payment plan" milestone option. The option represented in 508 is a "last payment" milestone option. Both options represented in user interface 506 and user interface 508 are represented with neutral reinforcement. Finally, user interface 510 presents the required statement category of the minimum balance due along with negative reinforcement.

In some embodiments, payment milestone service 106 can remember previously presented payment milestone categories and default to presenting the same payment milestone categories for the subsequent statement period. Notwithstanding the method illustrated in FIG. 8, in some embodiments, it may be seen as preferable to provide consistency from statement-to-statement. Providing such consistency may be beneficial especially when a customer is making choices that are considered helpful for their financial health whereas payment milestone options might be changed from one statement to another statement when the customer is making choices that are considered neutral or harmful for their financial health.

In some embodiments, payment milestone service 106 can analyze a customer's statement history and past selected payment options and categorize a customer to buckets of financial health or apparent financial literacy or apparent financial means and can present options on the basis of such categorization. For example, a customer characterized as having greater financial means, or greater financial health might be presented with higher payment values designed to maintain the customer's financial help. Whereas a customer characterized as having less financial health and be provided with lesser payment options to initially encourage the customer to pay a little more than they are accustomed, and the payment options can slowly increase each month.

In some embodiments, payment milestone service 106 can utilize machine learning to rank the desirability of presenting various payment milestones based on the likelihood that the payment milestones if selected, will result in increased financial health for the customer. For example, a machine learning algorithm could cluster customers based on various account characteristics to identify similar customers and for each cluster would analyze the payment option selected by each customer to determine which payment options yielded the best financial health outcomes over time in the group of similar customers.

Thereafter the machine learning algorithm can be used to predict which payment options will yield the best financial health outcomes based on the ability of the machine learning algorithm to characterize a customer. This approach should ensure that payment milestone service 106 is surfacing the recommended milestones that are most likely to lead to a positive change for the user.

While the present technology has primarily been discussed in the context of a credit statement, and specifically a line of credit or credit card statement, the present invention is applicable to all financial statements. For example, financial statements pertaining to investment accounts are equally confusing to credit card statements (or more so), and the present technology can be used to provide options to a customer to decide how much to save or invest in a given month and can take into account tax consequences and interest benefits from such decisions.

In some embodiments, the present technology can take into account a variety of financial statements including bank account statements, credit statements, and investment statements, and can provide an interface to help a user achieve greater financial health in a more holistic manner by taking into account monthly income, savings and investment opportunities, and debit payment opportunities. The interfaces discussed herein can be coordinated across each statement, or a single interface allocating money for savings, investment, and debt can be provided.

In some embodiments, a payment plan can be triggered in the middle of a statement period. Payment milestone service 106 can detect an abnormally large transaction in transactions database 104, and can send a notification to computing device 115. When the customer views the notification, payment milestone service 106 can recommend a payment plan for the abnormally large purchase.

In some embodiments, statements, and the payment milestones presented therewith can be dynamic. Usually financial statements are static as of the day the statement period closed. The present technology can dynamically update based on the most current information, and payment milestones can also dynamically adjust to account for new charges and new payments. In some embodiments, only the payment milestones are adjustable and the required statement categories might be static.

In some embodiments described herein, payment milestone service 106 has utilized information regarding previously selected payment options. In some embodiments, payment milestone service 106 can record previously selected payment options on computing device 115 for later reference.

In some embodiments, the present technology can provide incentives and rewards for healthy fiscal behavior. For example, the present technology can present a message offering a reduced interest rate on a balance as long as the user sticks to the payment plan addressed above. Similarly, the present technology could set goals for a user and add incentives to encourage the user to hit the incentives. In some embodiments, machine learning can be utilized to determine user accounts to be offered an incentive or reward, and to determine when to present an incentive.

In some embodiments, the present technology can also congratulate users on good fiscal decisions. The present technology can record that a user has paid enough each month for several months to begin to reduce any carried balance. In some embodiments, the technology can be adaptive and can recognize that a user usually pays the minimum balance but is now paying more for several months in a row. The present technology can congratulate or reward such a user.

While payment milestone service 106 is illustrated as being part of application 121, in some embodiments, it can be its own service running on computing device 115 that is utilized by application 121 or other applications. In some embodiments, the present technology is made available as an application program interface (API) to other services beyond statement service 123. Any financial account provider application on computing device 115 can access the API to the payment milestone service 106 to receive payment milestones and present a more helpful and intuitive statement interface.

Figure 11:
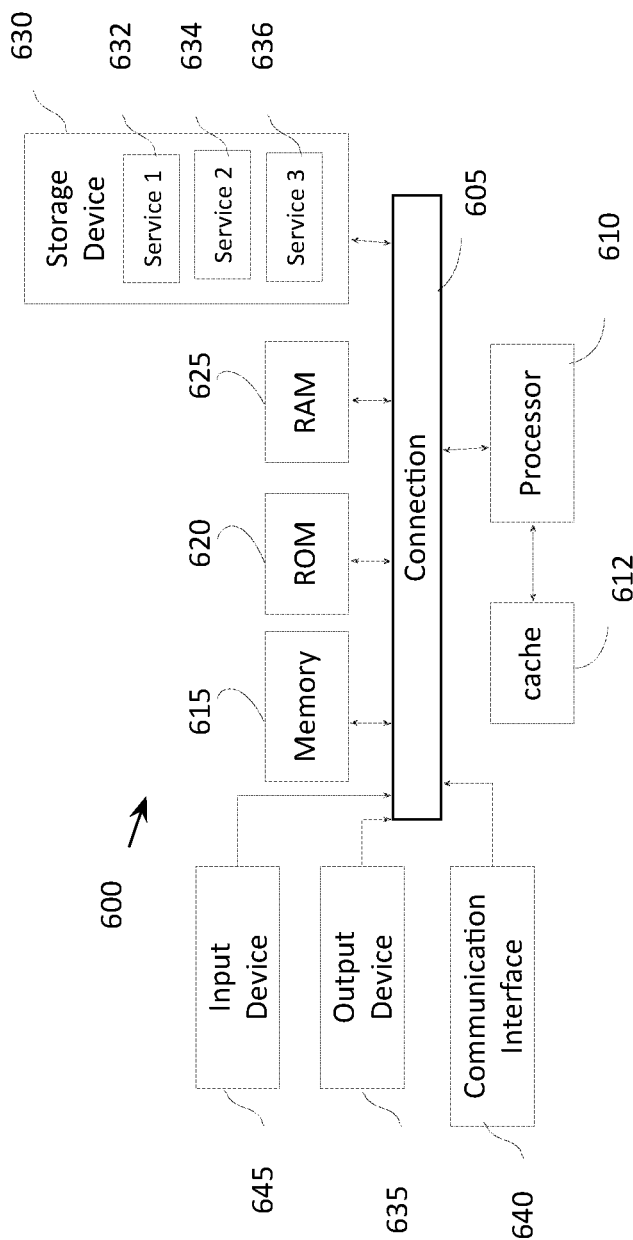
FIG. 11 illustrates an example system embodiment in accordance with some aspects of the present technology.

FIG. 11 shows an example of computing system 600, which can be for example any computing device making up transaction network 102 or computing device 115 or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-readable medium comprising computer-executable instructions stored thereon, when executed the computer-executable instructions are effective to cause a computing system to perform operations comprising:
   analyzing a collection of transactions and a carried balance for a statement period;
   determining a plurality of payment milestones, wherein one of the plurality of payment milestones is a last payment milestone;
   discarding a payment milestone of the plurality of payment milestones that is less than an amount paid on a previous statement;
   selecting a subset of the plurality of payment milestones remaining after discarding the payment milestone that is less than the amount paid on a previous statement; and
   presenting the subset of the plurality of payment milestones.

2. The computer-readable medium of claim 1, wherein the operations further comprise:
   determining a new purchases milestone by totaling all new purchases made during the statement period, the new purchases milestone being one of the plurality of payment milestones.

3. The computer-readable medium of claim 1, wherein the operations further comprise:
   determining a current utilization of a credit line;
   when the current utilization of the credit line is greater than a first threshold, determining a payment plan to pay off a total statement balance in a first time period; and
   when the current utilization of the credit line is less than a second threshold, determining a payment plan to pay off the total statement balance in a second time period, wherein the determined payment plan is a payment plan milestone that is one of the plurality of payment milestones.

4. The computer-readable medium of claim 3, wherein when the payment plan milestone was selected to pay a previous statement, the payment plan milestone for the statement is a payment plan to pay off the total statement balance in one month less than the number of months presented on the previous statement.

5. The computer-readable medium of claim 1, wherein selecting the subset of the plurality of payment milestones are effective to cause the computing system to:
   select a lowest two of the payment milestones.

6. The computer-readable medium of claim 5, wherein selecting the subset of the plurality of payment milestones are effective to cause the computing system to:
   prior to selecting the lowest two of the payment milestones, discard the payment milestone that is less than the amount paid on the previous statement.

7. The computer-readable medium of claim 5, wherein selecting the subset of the plurality of payment milestones are effective to cause the computing system to:
   prior to selecting the lowest two of the payment milestones, and when any of the payment milestones are less than a threshold difference in amount, discard all but one of the payment milestones that are less than the threshold difference in amount.

8. The computer-readable medium of claim 1, wherein the operations further comprise preparing a statement for the statement period, the statement comprising the subset of the plurality of payment milestones and one or more required statement categories.

9. A method, comprising:
   analyzing, by a computing device, a collection of transactions and a carried balance for a statement period;
   determining, by the computing device, a plurality of payment milestones, wherein one of the plurality of payment milestones is a last payment milestone;
   discarding, by the computing device, any payment milestone of the plurality of payment milestones that is less than an amount paid on a previous statement;
   selecting, by the computing device, a subset of the plurality of payment milestones remaining after discarding the payment milestone that is less than the amount paid on a previous statement; and
   presenting the subset of the plurality of payment milestones.

10. The method of claim 9, further comprising:
    determining, by the computing device, the last payment milestone by combining all of the payments made during a previous statement period, the last payment milestone being one of the plurality of payment milestones.

11. The method of claim 9, further comprising:
    determining, by the computing device, the last payment milestone by combining all of the payments made during a previous statement period;
    analyzing, by the computing device, categories associated with the collection of transactions for the statement period;
    identifying, by the computing device, a smallest category from the categories associated with the collection of transactions, wherein a total of all transactions associated with the smallest category is less than a total of all transactions associated with any other of the analyzed categories; and
    determining, by the computing device, the last payment plus smallest category milestone by combining the last payment milestone with the total of all of the transactions associated with the smallest category, the last payment plus smallest category milestone being one of the plurality of payment milestones.

12. The method of claim 9, further comprising:
    determining, by the computing device, a new purchases milestone by totaling all new purchases made during the statement period, the new purchases milestone being one of the plurality of payment milestones.

13. The method of claim 9, further comprising:
determining, by the computing device, a current utilization of a credit line;
when the current utilization of the credit line is greater than a first threshold, determining a payment plan to pay off a total statement balance in a first time period; and
when the current utilization of the credit line is less than a second threshold, determining a payment plan to pay off the total statement balance in a second time period, wherein the determined payment plan is a payment plan milestone that is one of the plurality of payment milestones.

14. The method of claim 13, wherein when the payment plan milestone was selected to pay a previous statement, the payment plan milestone for the statement is a payment plan to pay off the total statement balance in one month less than the number of months presented on the previous statement.

15. The method of claim 9, further comprising:
selecting, by the computing device, a lowest two of the payment milestones.

16. The method of claim 15, wherein the selection of the subset of the plurality of payment milestones further comprises:
prior to selecting the lowest two of the payment milestones, and when any of the payment milestones are less than a threshold difference in amount, discard all but one of the payment milestones that are less than the threshold difference in amount.

17. A computing system, comprising:
a memory configured to store computer-executable instructions; and
at least one processor configured to execute the computer-executable instructions to cause the computing system to at least:
analyze a collection of transactions and a carried balance for a statement period;
determine a plurality of payment milestones, wherein one of the plurality of payment milestones is a last payment milestone;
discard a payment milestone of the plurality of payment milestones that is less than an amount paid on a previous statement;
select a subset of the plurality of payment milestones remaining after discarding the payment milestone that is less than the amount paid on a previous statement; and
present the subset of the plurality of payment milestones.

18. The computing system of claim 17, wherein the computing system is further caused to at least:
determine a current utilization of a credit line;
when the current utilization of the credit line is greater than a first threshold, determine a payment plan to pay off a total statement balance in a first time period; and
when the current utilization of the credit line is less than a second threshold, determine a payment plan to pay off the total statement balance in a second time period, wherein the determined payment plan is a payment plan milestone that is one of the plurality of payment milestones.

19. The computing system of claim 18, wherein when a payment plan milestone was selected to pay a previous statement, the payment plan milestone for the statement is a payment plan to pay off the total statement balance in one month less than the number of months presented on the previous statement.

20. The computing system of claim 18, wherein the computing system is further caused to at least determine a new purchases milestone by totaling all new purchases made during the statement period, the new purchases milestone being one of the plurality of payment milestones.

* * * * *